June 17, 1924.　　　　G. W. STRECKFUSS　　　　1,498,508
BOTTLE CARRIER
Filed Aug. 11, 1923　　　　2 Sheets-Sheet 1
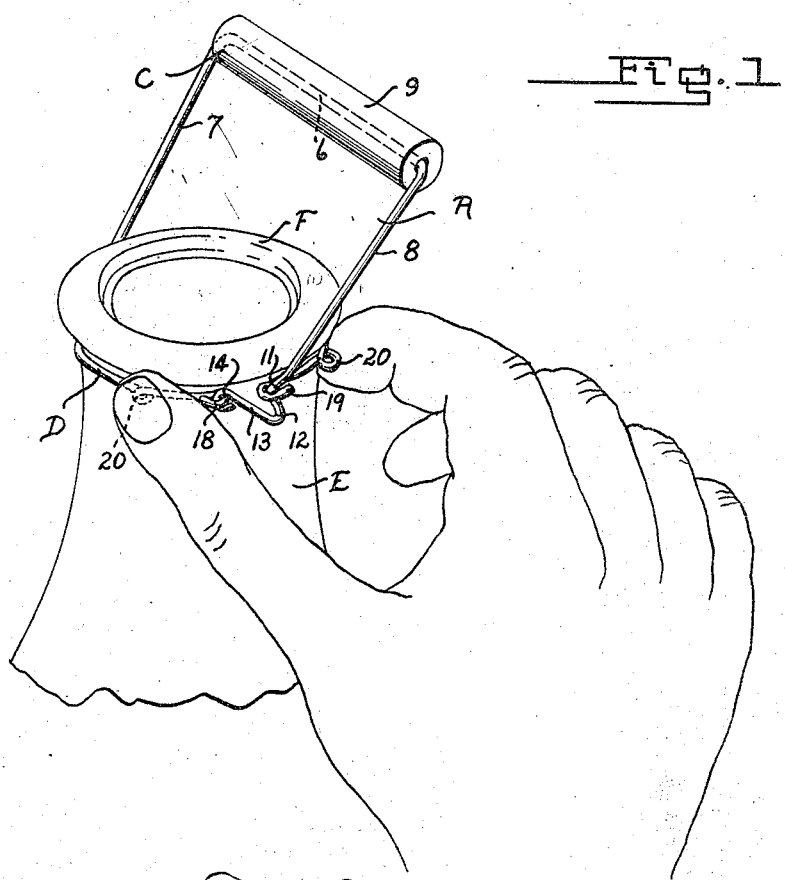
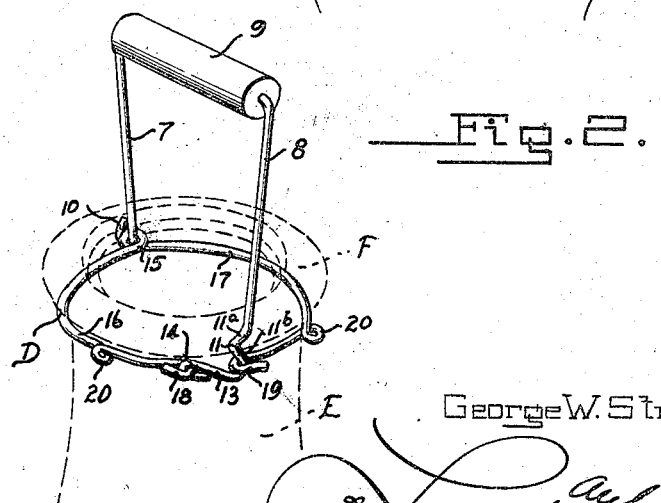
Inventor
George W. Streckfuss
By Lancaster and Allwine
Attorneys June 17, 1924.
G. W. STRECKFUSS
BOTTLE CARRIER
Filed Aug. 11, 1923
1,498,508
2 Sheets-Sheet 2
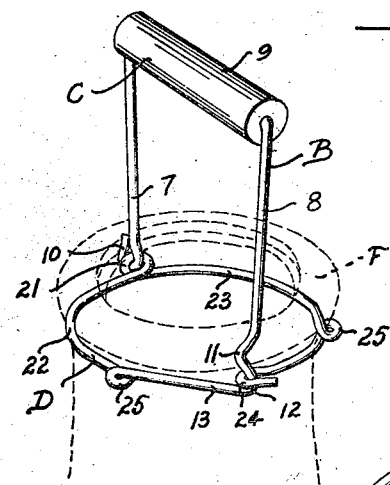
Fig. 5.
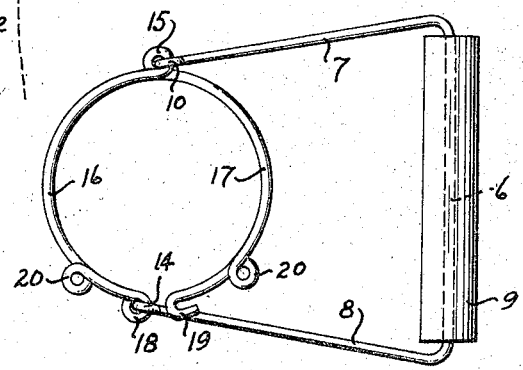
Fig. 3.
Fig. 4.
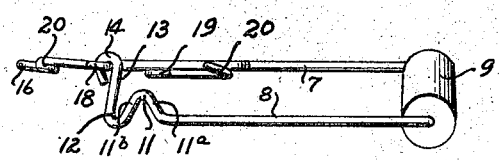
Inventor
George W. Streckfuss
By Lancaster Allwine
Attorneys Patented June 17, 1924.

1,498,508

UNITED STATES PATENT OFFICE.

GEORGE W. STRECKFUSS, OF SPRINGFIELD, ILLINOIS.

BOTTLE CARRIER.

Application filed August 11, 1923. Serial No. 656,833.

*To all whom it may concern:*

Be it known that I, GEORGE W. STRECK-FUSS, a citizen of the United States, residing at Springfield, in the county of Sangamon and State of Illinois, have invented certain new and useful Improvements in Bottle Carriers, of which the following is a specification.

This invention relates to improvements in bottle carriers and is particularly well adapted for use upon bottles having an annular flange at the top, such as an ordinary milk bottle, and the primary objects of the invention are to provide a bottle carrier which may be easily placed around the neck of the bottle so that the same may be securely carried; and, so formed as to embody novel means whereby the carrier may be conveniently and quickly removed from the bottle when so desired.

A further object of the invention is to provide a bottle carrier which is so formed and assembled as to be compactly folded and occupy a small amount of space when it is desired to pack them in large numbers for shipping or storing.

A still further object is to provide a bottle carrier which is durable and efficient in use, one that is simple and easy to manufacture, and one that can be placed upon the market at a reasonable cost.

Further objects and advantages will appear in the following detailed description, taken in connection with the accompanying drawings, forming a part of this specification, and in which drawings:

Figure 1 is a perspective view of a bottle carrier constructed according to my invention, showing it being placed by a user upon a milk bottle.

Figure 2 is a perspective view of the same, showing it in locked position, the milk bottle being shown in dotted lines.

Figure 3 is a plan view of the device showing it folded and substantially flat.

Figure 4 is a side elevation of the same, and,

Figure 5 is a perspective view of a modified form of bottle carrier formed of a single piece of wire, a portion of the bottle being shown in dotted lines.

In the drawings, wherein similar characters designate corresponding parts throughout the several views, the letter A designates the preferred form of the invention; and B, the modified form; both forms having in common a bail member C, and clamp member D; the clamp member D being adapted to encircle the neck of a bottle designated by E, beneath an annular flange F.

Referring now to both forms of the invention the bail member B preferably consists of a handle portion 6 and a pair of spaced arms 7 and 8 extending therefrom. The handle portion 6 may have a hand piece 9, usually of wood, fitted thereon, forming a comfortable hand grip. These arms 7 and 8 usually extend in diverging relation from the clamp D so as to provide a relatively large opening for the hand of a person carrying a bottle supported by the clamp D. As is clearly shown, the bail arm 7 terminates in a loop 10, which is adapted to be connected to a medial eye 15 formed in the clamp D which will be more fully described hereinafter. The other bail arm 8 extends downwardly from the handle 6 and is crimped at a point remote from the handle portion as at 11, the crimp providing converging slides $11^a$ and $11^b$ inclined to the axis of the bail arm 8, the slide $11^b$ terminating in a seat 12 from which projects an extension 13. In the preferred form of my invention, the extension 13 terminates in a loop 14 which is adapted to be connected to one terminal of the clamp D.

Referring now to the clamp D, as shown in the form A, it preferably comprises a medial eye 15 formed by bending the wire upon itself and has pivotally connected thereto the loop 10 of the arm 7. Extending from the eye 15 is the pair of arcuate arms 16 and 17 adapted to embrace the neck of the bottle E beneath the flange F. The arm 16 terminates in an eye 18 and has pivotally connected thereto the loop portion 14 of the extension 13. Thus by having the two bail arms 7 and 8 pivotally connected to the clamp member D, it is possible to swing the clamp around so as to be in substantially the same plane as the bail arm as is clearly shown in Figures 3 and 4 of the drawings, which provides a compactly folded bottle carrier. The other arm 17 terminates in a hook portion 19 which is adapted to pass around and engage the seat portion 12 of the bail arm 8 and hold the clamp D in a locked position around the neck of the bottle E. Adjacent the terminals of the clamp are formed a pair of loops 20 which define finger engaging lugs, and as shown in the drawings a user may contract the clamp D by pressing the loops toward each other and easily seat the hook 19 in the seat 12, thus locking the clamp on the neck of the bottle.

Referring to the modified form B, the clamp D is formed integral with the bail arm 8 and extends in right angular relation from the extension 13. A medial eye 21 is also formed on the clamp and to it is connected the loop 10 of the bail arm 7 and has extending therefrom the arcuate arms 22 and 23, the arm 23 terminating in a hook 24 for engagement with the seat 12. It can readily be seen that the arm 22 will be stationary with respect to the arms 7 and 8, while arm 23 is adapted to be sprung into and out of operative engagement with the seat 12. Finger engaging lugs 25 are formed on the clamp D, preferably one on each of the arms 22 and 23 respectively, and when pressed toward each other will contract the clamp and spring the hook 24 into or out of hooked engagement.

When applying either of the forms to a bottle, as for instance the form A, the arm 16 of the clamping member D is inserted under the flange F of the bottle. Now by grasping the finger engaging lugs 20 in any convenient way, as by the thumb and forefinger as is clearly shown in Figure 1 and pressing together, at the same time pushing the bail member C slightly forward the hook 19 may be made to ride on the slides of the crimped portion 11 and by releasing both hands will come to rest in the seat 12 formed beneath the crimp 11 and the bail member C will return to an upright position. The clamp is now securely locked in place around the neck of the bottle and may be carried at any angle desired without the liability of the bottle falling out or the hook becoming unfastened. When it is desired to release the clamp D, it is merely necessary to again grasp the finger engaging lugs and press toward each other and at the same time push the bail member C slightly forward and the hook will release itself and the device may be removed from the neck of the bottle.

From the foregoing description, it can be seen that a device has been provided which is simple in construction and which can be easily and quickly placed upon or removed from a bottle.

Changes in details may be made without departing from the spirit of the invention or the scope of the claims; but,

I claim:

1. A bottle carrier comprising a bail member and a clamp member, said clamp member adapted to encircle the neck of a bottle and separable transversely, and finger engaging lugs formed on the clamp to facilitate its being placed on or removed from the neck of a bottle.

2. A bottle carrier comprising a bail member and a wire clamp member, said clamp member adapted to encircle the neck of a bottle and separable transversely, loops formed on the wire clamp on each side of the terminals thereof and defining finger engaging lugs for facilitating the placing or removal of the clamp around the neck of the bottle.

3. A bottle carrier comprising a clamp member for encircling the neck of a bottle, said clamp member including a medial eye having a pair of arcuate arms extending therefrom and terminating one in an eye and the other in a hook, finger engaging lugs formed on said arms adjacent the terminals, and a bail member including a pair of spaced arms and having the terminals thereof pivotally secured to the respective medial and terminal eyes of the clamp member, the bail arm pivoted to the terminal eye having a crimp formed near its terminal defining a shoulder and a seat thereunder for the reception of the hook terminal of the clamp arm, said hook being forced over the crimp and into its seat by a user grasping the finger engaging lugs and contracting the clamp.

4. A bottle carrier comprising a clamp member for encircling the neck of a bottle, said clamp member including a medial eye having a pair of arcuate arms extending therefrom and terminating one in an eye and the other in a hook, finger engaging lugs formed on said arms adjacent the terminals, a bail member including a handle portion and a pair of spaced arms extending therefrom, one of said arms terminating in a loop and pivoted in the medial eye of the clamp, the other bail arm extending downwardly and having a crimp formed therein at a point remote from the handle portion defining a shoulder and a seat thereunder for the reception of the hook terminal of the clamp arm, said arm extending at a right angle from the seat and terminating at a point beyond said crimp in a loop pivotally secured to said terminal eye of the clamp arm, said hook being forced over the crimp and into its seat by a user grasping the finger engaging lugs and contracting the clamp.

GEORGE W. STRECKFUSS.